Aug. 7, 1962  H. S. CURTIS ET AL  3,048,356
BULKHEAD SEAL FOR MOVABLE CONTROL ELEMENT
Filed Aug. 11, 1960

INVENTORS
HAROLD S. CURTIS
JIMMIE C. CURTIS
JOHN M. OIVOLA
LEONARD H. MALETZ
GLEN W. MORRIS
RICHARD P. SCHILTZ
BY
Edwin Coates
·ATTORNEY·

United States Patent Office 3,048,356
Patented Aug. 7, 1962

3,048,356
BULKHEAD SEAL FOR MOVABLE CONTROL ELEMENT
Harold S. Curtis, Long Beach, Jimmie C. Curtis, Costa Mesa, John M. Divola, Calabasas, Leonard H. Maletz, Downey, and Glen W. Morris and Richard P. Schiltz, Long Beach, Calif., assignors to Douglas Aircraft Company, Inc., Santa Monica, Calif.
Filed Aug. 11, 1960, Ser. No. 49,004
11 Claims. (Cl. 244—129)

This invention relates to the mechanical control systems of aircraft, and particularly high-altitude aircraft having differentially pressurized compartments separated by an airtight bulkhead.

More particularly, the invention is concerned with the sealing of the rectilinearly movable control cables or push-pull rods of these systems where they pass through apertures in these bulkheads.

In the differentially pressurized, bulkhead-separated compartments of such aircraft, the humidity varies widely with altitude, latitude, seasons, etc. Thus, since the temperatures to which such aircraft and such control systems may be subjected may well vary from −65 to +160 F., condensation of the water vapor in the air of such compartments quite often deposits a very material film of water around the cable where it passes through the bulkhead. When the temperature of the compartment falls low enough, this water-coating becomes ice. The ice-layer has quite often seized and bound the cable immovably to the bulkhead aperture's periphery, although sometimes it merely increases the overall diameter of the control cable or rod to a degree where linear movement of the control element is seriously hampered and restricted.

Since these cables or rods transmit controlling forces to airfoils, to the power plant, or to important accessories, it is easy to understand that such "icing-up" could well spell disaster.

The present invention provides sealing means for aircraft mechanical controls which, because of the incorporation of triple-safety features, for one reason, definitely diminish the probabilities that the inevitable icing-up of the control members will result in jamming, binding, or otherwise impeding the rectilinear movements of the control member.

The invention functions under extremely detrimental conditions regarding ice formation and also takes care of the effects of the accumulation of debris, detritus and other foreign matter around the cable in the bulkhead aperture.

Briefly summarized, constructionally, in all its many typical embodiments the seal comprises a retainer fixed to the bulkhead around the aperture therein; a novel type of grommet arranged concentrically in the retainer and having an aperture for the passage therethrough of the control element, and a special sheath on the cable where it passes through said grommet.

Several of the presently-preferred typical embodiments of the seal are representationally depicted in the accompanying drawings and are described in detail hereinafter in conjunction with these drawings, both the drawings and the description being exemplicatory, merely, and not constituting the sole forms of construction which the invention may assume.

Figure 1:
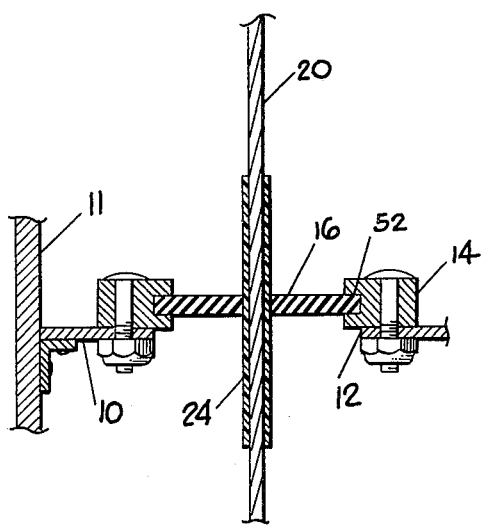
FIG. 1 is a fragmentary sectional view of a bulkhead in a fuselage having a sealed aperture, with a control element shown in plan as passing through one of the present seals.

The construction shown in FIG. 1 comprises a pressurized bulkhead 10 extending transversely of a fuselage 11. Bulkhead 10 includes a rather large aperture 12 for the reciprocation therethrough, in an airtight manner, of a rectilinear, rectilinearly movable control element 20, which may be one that operates a control-surface of the aircraft. Or, it may well be a push-pull rod for controlling the operation of some other vital component of the aircraft.

In FIG. 1 a grommet retainer 14 is provided which is of annular form and is composed of a flexible material, such as an elastomer, a silicone rubber, for example, or a suitable flexible plastic. It is so arranged and configured with respect to the bulkhead aperture and the other components of the present seal as to multiply or augment the deflections or yieldings of the other components, as hereinafter elucidated, while itself being yieldable transversely thereof.

The invention also contemplates inhibition of ice-formation on the cable itself, where it works through the bulkhead, by the provision of a sleeve, sheath or coating 24 on that portion of the length of the control member which works through the bulkhead. The adherent sleeve 24 is composed of a material having a low coefficient of adhesion with respect to water or ice, and a low coefficient of friction with the adjacent portion of the seal. The invention contemplates the use of a polyfluoroethylene, a polyfluoropropylene, or the like, for the coating on this sleeve, which coating adheres firmly to the cable but only very slightly to water and ice.

It follows that the shearing force per unit of the area of contact between sheath 24 and water or ice, which force is the minimum value required to move the control cable axially, is reduced to such a low value that a force only slightly greater than the normal amount of manual effort usually exerted by the pilot will be required to break away the thus sheathed cable from the ice layer binding it to the remainder of the seal. Thereby the cable is restored to its normal free movement.

The next one of the three safety features of the seal resides in the grommet 16. In FIG. 1, 16 consists of a centrally perforate disk composed of some such resiliently-flexible material as one of the elastomers, a flexible plastic, of the like. One of the silicone rubbers has been found to be satisfactory for the present purposes.

The clearance between the control element or the sheathed cable and the adjacent portion of the seal, i.e., the grommet, is minimized to minimize leakage of air, maintaining the differential pressure between the aforesaid two elements.

Figure 4:
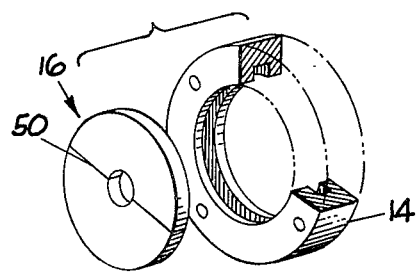
FIG. 4 is an exploded perspective view of the novel grommet portion and its supporting ring shown in FIG. 1.

Grommet 16 is diametrally divided, by a parting plane 50, FIG. 4, into two closely fitting mating halves, the assembly being flexibly mounted at its periphery in an annular groove, 52, in the inner periphery of the flexible retainer 14.

Considering the seal as a whole, with the exception of the functioning of sheath 24, upon the formation of ice between 16 and 24 substantially any axial force applied to the control element will deflect 16 in the forward or the aft direction of the aircraft. Since this deflection is analogous to that occurring in a simple, edge-mounted diphragm when a thrust is applied at or near its center, the deflection of 16, even before the two halves are separated and dislodged, will effect cracking off of the ice between 24 and 16.

It is anticipatable that radial loads may come onto grommet 16 because of misalignment of cable 20, and with this in view, the minimum thickness of grommet 16 is commensurately gaged or calibrated to these radial loads. Thus, the minimum of contact area is provided between any ice on sheath 24 and the aperture in grommet 16. The maximum thickness of 16 is determined by the maximum anticipatable radial loads that may be imposed on 16 by misalignment of the cable, if the latter event should occur.

The diametral division of grommet 16 not only augments the resultant deflection of 16, by movement of the cable, if ice lies between them, but such division also results in both halves of the grommet being eventually urged completely out of the bulkhead and out of 14 if, due to icing, the cable does not respond to normal pilot effort thereon.

However, upon their bodily removal from, or bodily displacement out of the confines of 14, these halves of 16 fall to the deck, clear off the cable and out of the bulkhead so that they can neither jam the cable in the aperture nor slide along the cable to cause jamming of same elsewhere.

Although retainer 14 is flexible, it is, in FIG. 1 made thicker than grommet 16 so that in the event that the cable should seize to grommet 16, due to ice, the axial force on the cable necessary to push grommet 16 out of 14 is less than that required to move the cable with reference to the grommet. Accordingly, if the cable should happen to be jammed in 16 by foreign material other than ice, say, for example, by metal filings, dust particles, waste or the like, the cable cannot be seized thereby to the bulkhead.

The fact that both 14 and 16 can be composed of a silicone rubber assures that their coefficient of adhesion with ice will be so low that the second safety feature—easy breakaway of 16 from 14—will always be effective even under the extreme contingency that water freezes between 16 and 14 and between 16 and 24.

Figure 2:
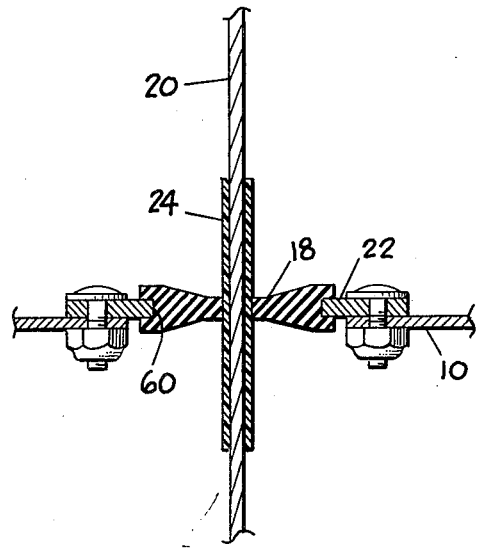
FIG. 2 is a similar view of another species of the seal in a similar location.

In FIG. 2, the same fundamental concepts are incorporated, the chief distinctions residing in the fact that here the proportionality of the grommet, 18, to the retainer, 22, is reversed, so that the diametrally divided grommet is thicker than the retainer and can bear the annular peripheral groove 60 and the retainer here has its inner periphery fitted into groove 60. Here, the retainer may start to yield before the grommet does, so that the ice may crack off before the grommet halves are urged out of the retainer by cable motion. However, continued and stronger motion of the cable will urge the grommet halves out of the retainer, if necessary to free the cable.

Figure 3:
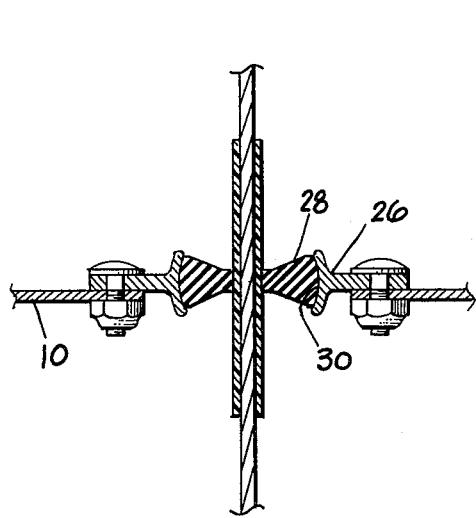
FIG. 3 is a similar view of yet another species of the seal in a similar location.

In FIG. 3, the inner periphery 30 of the retainer, 26, is socket-like in conformation and the outer periphery of the diametrally divided grommet 28 is bulbous, or shaped complementarily to the socket on 26. One of the chief advantages of this species resides in ease of assembly of grommet to retainer, both upon initial installation and upon reassembly after the grommet halves have been urged to fall out of the retainer.

It will of course be taken notice of that if and when the central grommet is forced out of the retainer, pressure air may rush through the thus enlarged aperture and abolish the air pressure differential between adjacent compartments. However, the grommet halves can be quickly and readily replaced in the retainer to re-establish the air pressure differential. Moreover, it is obviously better to suffer a loss of pressure differential for a short time than to suffer the consequences of ice-jammed control cable. The latter consequences, of course, could well be disastrous to the aircraft and its crew and passenger.

Although in order to render this disclosure concrete and clear, certain specific terminology or terms of art have been employed, it is to be understood that such details do not constitute the invention itself. The invention, in fact and in law, is itself defined and recited in the sub-joined claims.

We claim:

1. Means for dislodging ice from a sealed aperture in a partition through which reciprocates an elongate control-element, comprising: a partition having a reciprocatable control element-receiving aperture therein; a planar flexible retainer diaphragm fixed facewise to one face of said partition and having an aperture therein for receiving an apertured grommet; and a flexible grommet mounted in the aperture in the retainer diaphragm substantially coplanarly with the retainer, the retainer diaphragm being axially flexural by movements of the elongate element to dislodge ice lying between the retainer diaphragm and the grommet so as to enable a certain amount of axial movement of the elongate control element with respect to the seal even if the grommet should tend to jam in the retainer-diaphragm and if the control element should ice-jam in the grommet.

2. Means for dislodging ice from a sealed aperture in a partition through which reciprocates an elongate control-element, comprising: a partition having a control element-receiving aperture therein; a flexible, apertured retainer-member fixed facewise to one face of said partition around said aperture; a planar, flexible diaphragm-grommet, having a central aperture for the control element, mounted coplanarly and concentrically in the aperture in the retainer member, said diaphragm grommet comprising two planar mating halves and having its outer periphery substantially coplanarly interengaged with the inner periphery of the retainer-means whereby a predetermined axial force exerted on the planar grommet flexes said grommet and dislodges ice from between the control element and the grommet, a higher such axial force dislodging both halves of the grommet from the retainer means, both actions together eradicating all ice from the sealing-means.

3. In a sealing arrangement of the class described, for an aperture in a partition through which a control-element reciprocates: the combination of a planar, flexible, apertured retainer-diaphragm fixed substantially facewise to one face of the partition around the aperture in the partition; a planar, flexible apertured retainer diaphragm-grommet mounted coplanarly in the retainer diaphragm, said diaphragm-grommet being diametrally divided and being flexible under axial loads applied by the control element to crack off ice from between it and the control element even while still remaining unitary and held in place by the retainer means; augmented such axial forces separating the diametral halves of the planar grommet and bodily displacing said halves out of the partition and eradicating foreign matter from the control element and cracking off ice from the retainer diaphragm.

4. A combination according to claim 1 and in addition thereto, a non-hygroscopic, water repellent sheath fixed to and encompassing said elongate element where it reciprocates through the partition, said substance precluding the formation of ice thereon and minimizing the possibility of the jamming of said control element in the planar grommet.

5. A combination according to claim 4, in which the non-hygroscopic substance ensheathing the control element is selected from the group consisting of polyfluorethylene and polyfluoropropylene with a high surface tension effect on water condensing thereon so as to preclude the formation of ice between the ensheathed control-element and the diaphragm-grommet.

6. A combination according to claim 1, in which the planar, diaphragm grommet is composed of a flexible, substantially frictionless material selected from the group including the silicone rubbers.

7. A combination according to claim 1, in which the planar, diaphragm-retainer-means is thicker than the grommet and has an annular groove in its inner periphery into which the outer periphery of the planar flexible diaphragm grommet is disengageably seated for disengagement from the retainer and out of the partition by axial forces exerted on the grommet by said reciprocatable control element, thereby to eradicate ice from the sealing means.

8. A combination according to claim 1, in which the flexible grommet is thicker than the diaphragm retainer-means, there being an annular groove in the outer periphery of the grommet which disengageably receives the inner periphery of the planar retainer-means.

9. A combination according to claim 1, in which the inner periphery of the substantially planar diaphragm-retainer-means is flared into an inwardly concave socket shape, the outer periphery of the substantially planar flexible grommet being enlarged, the enlarged periphery of said diaphragm-grommet disengageably seating in said socket and being removable therefrom by axial flexural forces applied to the grommet by reciprocation of said control element.

10. A sealed aperture in an apertured partition, through which aperture an elongate member reciprocates, comprising: a planar, apertured, diaphragm retainer-means fixed facewise to the one face of the partition around the aperture therein; a planar, flexible, apertured diaphragm grommet mounted coplanarly and concentrically in the aperture in the retainer-means, said grommet being diametrally divided and being initially axially flexible while mounted in said retainer-means and being then bodily displaceable, in two halves from within the confines of the retainer-means and out of contact with said elongate element by further axial forces acting thereon; and a sheath, having a water-repellent and high surface tension incompatibility for water-condensate fixed to and encompassing said elongate element and minimizing the possibility of ice jamming said elongate element in the grommet.

11. A combination according to claim 1, in which the adjacent peripheries of the grommet and of the retainer diaphragm overlappingly engage, one over the other, the engagement being flexurally disengageable by axial forces exerted on the grommet by the elongate member.

References Cited in the file of this patent

UNITED STATES PATENTS

| | | |
|---|---|---|
| 1,486,420 | Crowell | Mar. 11, 1924 |
| 1,983,368 | Hathorn | Dec. 4, 1934 |
| 2,395,852 | Custer | Mar. 5, 1946 |
| 2,717,792 | Pelley | Sept. 13, 1955 |

FOREIGN PATENTS

| | | |
|---|---|---|
| 107,509 | Great Britain | July 5, 1917 |